(12) United States Patent
Wobben

(10) Patent No.: US 7,108,485 B2
(45) Date of Patent: Sep. 19, 2006

(54) REDUCTION IN THE NOISE PRODUCED BY A ROTOR BLADE OF A WIND TURBINE

(76) Inventor: Aloys Wobben, Argestrasse 19, Aurich (DE) 26607

( * ) Notice: Subject to any disclaimer, the term of this patent is extended or adjusted under 35 U.S.C. 154(b) by 68 days.

(21) Appl. No.: 10/802,568

(22) Filed: Mar. 17, 2004

(65) Prior Publication Data

US 2005/0008495 A1   Jan. 13, 2005

Related U.S. Application Data

(63) Continuation of application No. 09/857,925, filed as application No. PCT/EP99/09691 on Dec. 9, 1999, now Pat. No. 6,729,846.

(30) Foreign Application Priority Data

| Dec. 9, 1998 | (DE) | 298 22 003 U |
|---|---|---|
| Jun. 28, 1999 | (DE) | 199 29 386 |
| Oct. 1, 1999 | (DE) | 199 47 211 |
| Oct. 25, 1999 | (DE) | 199 51 346 |

(51) Int. Cl.
   *F03D 1/06* (2006.01)
(52) U.S. Cl. .................................. 416/241 A
(58) Field of Classification Search ............ 416/241 A, 416/228, 235, 236 R; 415/200
   See application file for complete search history.

(56) References Cited

U.S. PATENT DOCUMENTS

| 3,743,440 A | 7/1973 | Moore .......................... 416/84 |
| 3,897,170 A | 7/1975 | Darvishian ................... 416/119 |
| 4,071,688 A | 1/1978 | Lynch et al. ............. 174/138 R |
| 4,650,138 A | 3/1987 | Grose ........................... 244/130 |
| 4,666,762 A | 5/1987 | Yamamoto ................... 428/216 |
| 4,692,094 A | 9/1987 | Kulinyak ...................... 416/11 |
| 4,706,910 A | 11/1987 | Walsh et al. ................. 244/130 |
| 4,759,516 A | 7/1988 | Grose ........................... 244/130 |
| 4,865,271 A | 9/1989 | Savill ........................... 244/200 |
| 4,930,729 A | 6/1990 | Savill ........................... 244/200 |

(Continued)

FOREIGN PATENT DOCUMENTS

DE   3903704 A1   8/1990

(Continued)

*Primary Examiner*—Thomas E. Lazo
*Assistant Examiner*—Richard A. Edgar
(74) *Attorney, Agent, or Firm*—Seed IP Law Group PLLC

(57) ABSTRACT

Rotor blades for wind power installations are known in many different forms. In a wind power installation the rotors or the rotor blades thereof represent the main source of sound. For reasons relating to acceptance and noise prevention laws, the aim should/must be that of minimizing the levels of sound emission as wind power installations are often also set up in the proximity of residential accommodation. The levels of sound emission which hitherto occur with a wind power installation or a wind power converter also mean that wind power installations are faced with resistance from populated areas because of the sound they produce and for that reason such installations can be accepted sometimes with difficulty or not at all as authorities responsible for planning permission refuse permission for wind power installations because of the existing environmental requirements, noise also being an environmentally polluting factor. Therefore the object of the invention is further to improve the noise emission of wind power installations. Wind power installation rotor blade comprising means for reducing the sound produced by a rotor blade, wherein the means is formed by a fluid-repellent layer and/or surface which is provided at least on a surface portion of the rotor blade.

9 Claims, 3 Drawing Sheets

U.S. PATENT DOCUMENTS

| | | | |
|---|---|---|---|
| 5,109,442 A | 4/1992 | Klainer et al. | 385/12 |
| 5,133,516 A * | 7/1992 | Marentic et al. | 244/130 |
| 5,194,723 A | 3/1993 | Cates et al. | 250/205 |
| 5,244,956 A | 9/1993 | Miller | 524/403 |
| 5,386,955 A | 2/1995 | Savill | 244/200 |
| 5,401,149 A | 3/1995 | Tsuru et al. | 418/178 |
| 5,499,904 A | 3/1996 | Wallace et al. | 416/230 |
| 5,681,661 A | 10/1997 | Kelly | 428/601 |
| 5,747,561 A | 5/1998 | Smirnov et al. | 523/212 |
| 5,848,769 A | 12/1998 | Fronek et al. | 244/200 |
| 5,919,568 A | 7/1999 | Wolf | 428/413 |
| 6,177,189 B1 | 1/2001 | Rawlings et al. | 428/343 |
| 6,247,669 B1 | 6/2001 | Rauckhorst, III et al. | 244/134 A |
| 6,345,791 B1 | 2/2002 | McClure | 244/200 |
| 6,446,710 B1 | 9/2002 | Beeck et al. | 165/109.1 |

FOREIGN PATENT DOCUMENTS

| | | |
|---|---|---|
| DE | 19614420 A1 | 10/1997 |
| DE | 29805833 U1 | 11/1998 |
| DE | 29810364 U1 | 11/1999 |
| EP | 0 284 187 A1 | 9/1988 |
| EP | 0284187 A1 | 9/1988 |
| EP | 0 354 022 A3 | 2/1990 |
| EP | 0354022 A3 | 2/1990 |
| EP | 0652367 A1 | 5/1995 |
| EP | 0 659 641 A1 | 6/1995 |
| EP | 0659641 | 6/1995 |
| EP | 0772514 B1 | 5/1997 |
| JP | 61-140178 | 6/1986 |
| JP | 63-263198 | 10/1988 |
| JP | 02-081796 | 3/1990 |
| JP | 05-196243 | 8/1993 |
| JP | 07-225048 | 8/1995 |
| JP | 09-176572 | 7/1997 |
| WO | WO 9409074 A1 * | 4/1994 |

* cited by examiner

REDUCTION IN THE NOISE PRODUCED BY A ROTOR BLADE OF A WIND TURBINE

BACKGROUND OF THE INVENTION

1. Field of the Invention

Rotor blades for wind power installations are known in many different forms. In a wind power installation the rotors or the rotor blades thereof represent the main source of sound. For reasons relating to acceptance and noise prevention laws, the aim should/must be that of minimizing the levels of sound emission as wind power installations are often also set up in the proximity of residential accommodation. The levels of sound emission which hitherto occur with a wind power installation or a wind power converter also mean that wind power installations are faced with resistance from populated areas because of the sound they produce and for that reason such installations can be accepted sometimes with difficulty or not at all as authorities responsible for planning permission refuse permission for wind power installations because of the existing environmental requirements, noise also being an environmentally polluting factor.

2. Description of the Related Art

Many proposals have already been put forward for structurally modifying a rotor blade of a wind power installation in such a way as to afford a reduction in noise. By way of example reference is made here to the documentation as is disclosed in EP-A-0 652 367 or DE 196 14 420.5.

However a reduction in noise by virtue of structural measures on the rotor blade is possible only to a limited extent.

BRIEF SUMMARY OF THE INVENTION

Therefore the object of the invention is further to improve the noise emission of wind power installations.

In accordance with the invention that object is attained by a rotor blade having the features of claim 1. Advantageous developments are set forth in the further claims.

The invention is based on the realization that, if the surface of a rotor blade is at least partially provided with a fluid- and/or ice-repellent layer, the rotor blade also becomes rougher. Therefore, instead of providing the rotor blade with a coating comprising a coat of paint which imparts to the rotor blade on the top thereof a maximum degree of smoothness, it is precisely the opposite that is done, namely it is given a surface which is rough in respect of microstructure. Such surfaces are also known for example from lacquers or coatings which perform the functionality of the so-called "lotus effect", so that water/ice adheres only weakly to the surface. In that respect the coating which is produced from a coat of paint comprises a kind of bed of nails of nano size. Those nano-nails of the bed not only roughen up the surface of the rotor blade but also impart a lower level of hardness to the surface because the individual nano-nails are also deformable in their longitudinal direction or are considerably softer in respect of their structure, than the glass fiber coating of a rotor blade.

Thus the "lotus" coating on the rotor blade provides that the eddies which are formed on the top side of the rotor blade are restrained or checked by the soft structure of the surface or energy is taken from the eddies of air so that overall—as has been noted—the sound which is produced upon rotation of the rotor blade is reduced.

The micro-silicone paint "Lotusan" (trade mark of ispo GmbH, a company of the Dyckerhoff Group) may be mentioned as a self-cleaning coating or paint with which a considerable reduction in noise of a rotor blade can be achieved in operation. That micro-silicone paint is marketed by the company under the article designation No 1950 and is described as being dirt- and water-repellent. It is also possible for the coating to be formed by a sheet or foil, the surface structure of which forms a water-repellent layer. Self-cleaning surfaces (and the production thereof) are also known from EP 0 772 514.

DETAILED DESCRIPTION OF THE INVENTION

Figure 1:
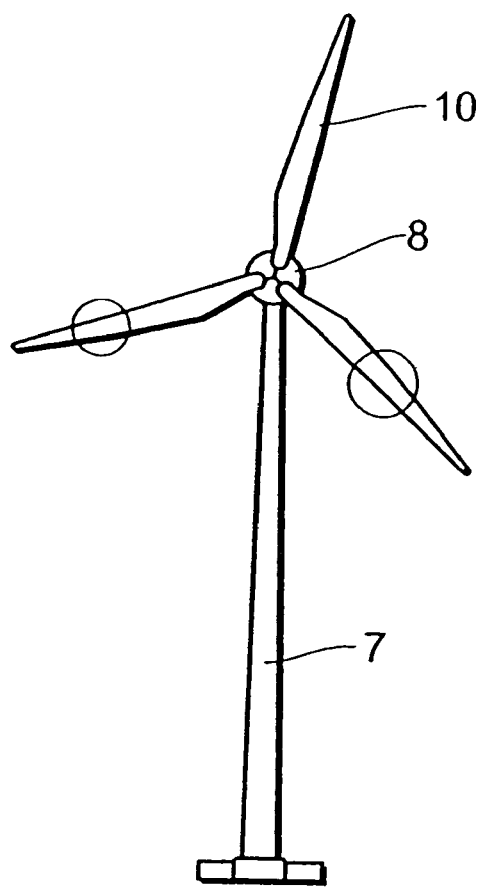
FIG. 1 is a front view of a wind power installation including a rotor.

FIG. 1 is a front view of a wind power installation comprising a rotor which carries three rotor blades 10. FIG. 1 shows a wind power installation of type E-40 from Enercon.

Figure 2:
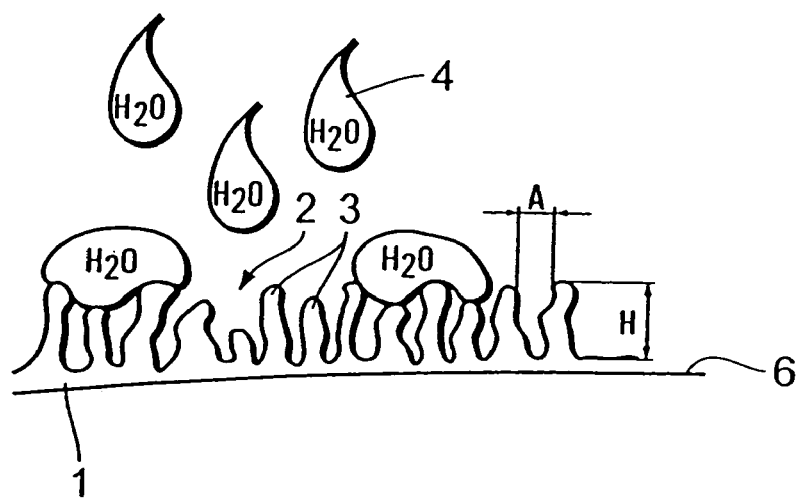
FIG. 2 is a cross-sectional view of an enlarged portion of a surface of a rotor blade from FIG. 1.

FIG. 2 shows a view in cross-section of a part of a rotor blade. It can be seen in this respect that disposed on the surface is a coating 1 or a covering which forms a bed of nails 2 comprising "nano-nails" 3. The spacing A between the nano-nails is in the range of between about 2 and 250 μm and the height H of the nano-nails is in the range of between about 2 and 250 μm. The nano-nails comprise for example hydrophobic polymers or durably hydrophobized materials. Particularly good results for reducing the sound produced by the rotor blade are achieved if the nano-nails are of a height of between 5 and 60 μm and their mutual spacing is approximately in the range of between 5 and 110 μm.

The coating of the rotor blade with a micro-silicone paint (for example "Lotusan") also has the consequence that water ($H_2O$) or other fluids do not remain clinging to the rotor blade surface. This therefore also takes away from the outset the basis for any icing on the blade.

Preferably the coating is not applied entirely to the rotor blade but only in the last third (as viewed from the rotor) of the rotor blade and there preferably in the region of the rotor blade tip or at the rotor blade trailing and leading edges.

Due to the formation of the nano-nails 3 the surface of the rotor blade is of very great irregularity or roughness so that the mass attraction of water drops 4 (molecules) and the rotor blade surface is not sufficient for the water molecules to remain clinging thereto. The nano-nails therefore so-to-speak hold the foreign water molecules at a spacing relative to the surface 6 of the rotor blade, whereby the attraction force between the water molecules and the surface is drastically reduced.

At the same time the nano-nails 3 have so-to-speak the function of a "(sound) shock absorber" because eddies (not shown) which naturally form on the surface of the rotor blade and which are responsible for the generation of sound impinge on the nano-nails which in turn, by virtue of their relatively great mobility, compared to the rigid glass fiber structure of the rotor blade, can absorb the energy of the eddies and thus take energy away from the air eddies so that the sound is reduced.

The coating can be formed by an applied coat of paint or by a foil or sheet secured by adhesive.

The above-mentioned coating can be applied not only to a rotor blade or parts thereof, but also to other parts of the wind power installation, for example to the tower 7 of the wind power installation and/or to the casing 8. The casing 8—which is usually also referred to as the pod—is disposed at the head end of the tower and regularly encloses the generator of the wind power installation or other parts of the wind power installation which are not to be exposed directly to the environmental influences. In that respect the coating may be provided not only externally on the tower or rotor blade and/or the casing, but also on the inside. For that purpose, it is advantageous if drip channels (not shown) are provided on the inside and/or outside, by way of which for example the water which runs off the tower and/or the casing can be caught, collected and carried away in a controlled fashion. Such channels preferably extend substantially perpendicularly (or slightly inclined with respect to thereto) relatively to the longitudinal axis of the tower on the wall of the tower and the liquid which is caught is carried away by a down pipe connected thereto.

Alternatively or supplemental to the above-described structure the reduction in the generation of noise can also be achieved by the rotor blade having a special surface in the manner of a "shark skin". That surface can be created by adding a sheet or foil coating. Such a foil or sheet is sold for example by 3M under the type designation 3M 8691 Drag Reduction Tape (Riblet Tape). That foil or sheet was developed as a commission from the aviation industry, with the aim of achieving a saving in fuel for aircraft by virtue of that specific "shark skin" surface.

The structure of such a "shark skin foil" is known for example from publications by Dittrich W. Bechert (Abteilung Turbolenzforschung des Deutschen Zentrums für Luft- and Raumfahrt (DLR)—Turbulence Research Division of the German Aerospace Centre). The structure of a "shark skin foil" (coating) is also described in detail inter alia in EP fl 846 617, DE-C-36 09 541 or DE-C-34 14 554. For the avoidance of repetition the content of all the above-indicated publications is also to be deemed to be content of the present application.

As the sound in the case of aircraft is essentially determined by the engines, the sound produced by the aircraft is not reduced, especially as the sound levels which are generated by virtue of the dynamic events on the aircraft (aerofoil) are below the listening threshold and therefore cannot be perceived.

A foil in accordance with the principle of the shark skin (under a corresponding surface) was developed by an engineering team headed by Dr. Dietrich W. Bechert of the Abteilung Turbolenzforschung des Deutschen Zentrums für Luft- and Raumfahrt (DLR) (translation: Turbulence Research Division of the German Aerospace Centre) at the Techinical University of Berlin.

Figure 3:
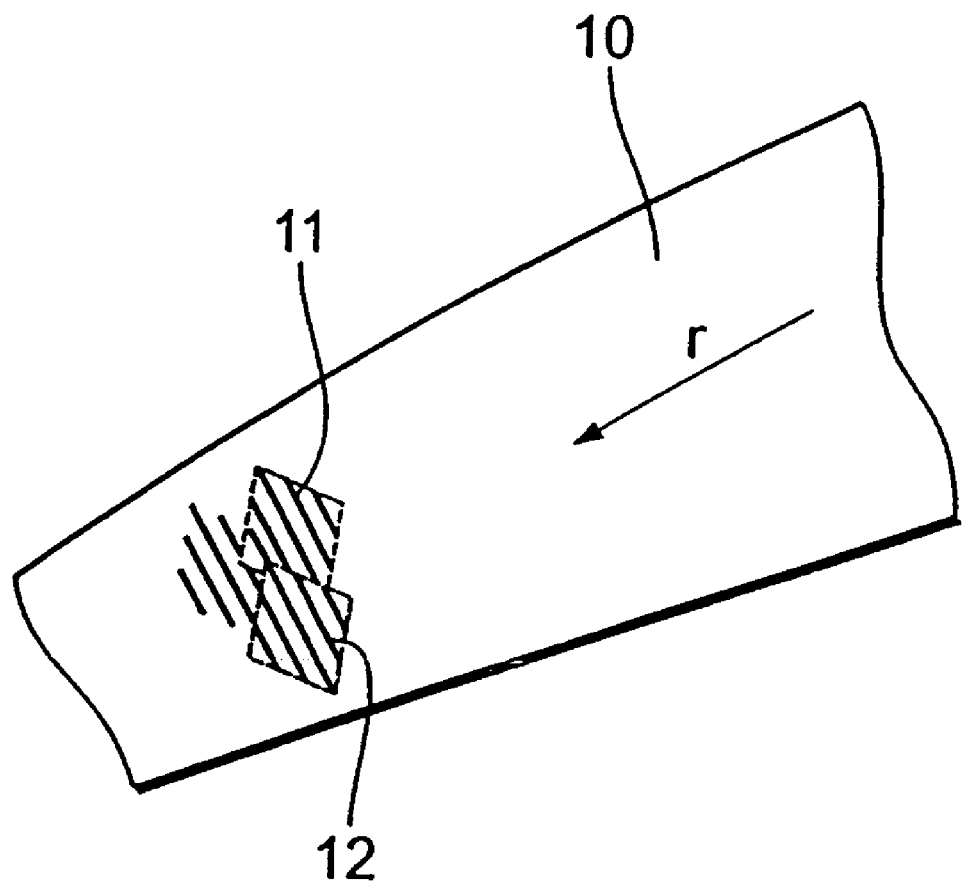
FIG. 3 shows a rotor blade 10 having shark skin pattern thereon according to principles of the present invention.

FIG. 3 shows the case of such a "shark skin" foil the surface of the foil has fine channels formed between ribs 11 extending in the flow direction on rotor blade 10. Those channels are not continuous but are disposed on panels (scales) 12 which in turn are arranged in mutually displaced relationship, as shown in FIG. 3. In the illustrated example a "scale" 12 has five channels between ribs 11 which are of different lengths and which are oriented with their longitudinal direction perpendicular (or parallel) to the radius r of the rotor blade of a wind power installation.

Figure 4:
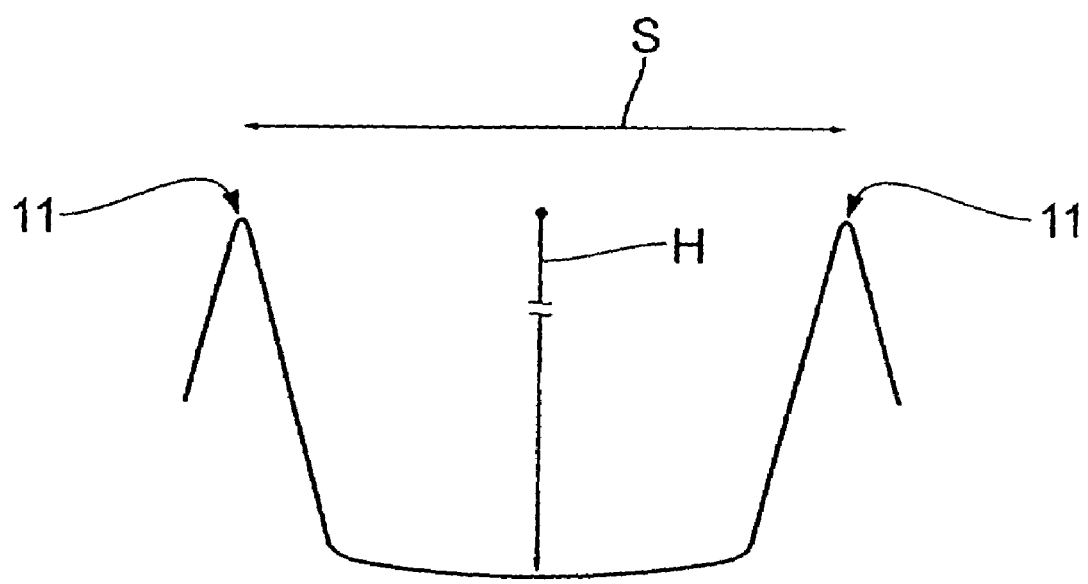
FIG. 4 shows a cross-sectional view of the enlarged shark skin pattern of FIG. 3.

As shown in FIG. 4, in this case the height H of the ribs 11 that form the channels is about between 30 and 70% of the channel spacing s and the ribs are preferably of a wedge-shaped configuration with a taper angle of between about 5 and 60°.

The standardized lateral rib spacing of the shark skin foil surface in this case in accordance with the formula $s^+=(s/ny)*\sqrt{(tau_0/rho)}$ is between 12 and 22, wherein s is the lateral rib spacing, $tau_0$ is the wall tension of a smooth reference surface which is exposed to the same flow, rho is the density of the flow medium (air) and ny is the kinematic viscosity of the flow medium (air). In this case the standardized rib spacing $s^+$ is preferably adjusted to peripheral speed (or angular speed) of a rotor blade of a wind power installation in operation at nominal rating. Preferably in that respect it is adjusted to the peripheral speed of the rotor blade tip or the rotor blade tip region (between about 5 and 25% of the rotor blade length).

The channel spacings in that case is between 0.001 and 0.15 mm.

It is also possible for surface structures with a differing channel spacing and/or scale spacing to be provided over the entire rotor blade surface so that adjustment of the standardized channel spacing is always to the respective peripheral speed of the rotor in nominal operation.

Preferably the lateral attachments of the ribs also have a radius of curvature of a maximum of 50%, preferably a maximum of 20%, of the lateral rib spacing s.

It is also advantageous if the surface of the shark skin foil, between the ribs, has a radius of curvature of at least 200% of the lateral rib spacing. That is shown on an enlarged view in cross-section in FIG. 4.

Initial tests have shown that the sound emission of a rotor with rotor blades which have the above-described shark skin foil (and thus also the corresponding surface as described) could be reduced by between about 0.2 and 3 dB (depending on peripheral speed and wind conditions).

A measure as an alternative to or supplemental to the above-described sound-reduction measures can also involve providing portions of a rotor blade, in particular the rotor blade leading edge, with an anti-erosion lacquer or paint. For example a solvent-bearing 2-component PUR lacquer with TEFLON like surface properties can be provided as such an anti-erosion lacquer. Hitherto, anti-erosion foils or sheets have been glued onto rotor blade leading edges in order to prevent erosion of the rotor blade leading edge due to dirt particles/rain/hail etc. Gluing on that foil is very complicated and troublesome and has to be carried out with an extremely great amount of care in order to prevent it from rapidly becoming detached in operation. In spite of the greatest amount of care being applied, it nonetheless repeatedly happens that the applied foils come loose, which under some circumstances can also result in an increase in the sound level in operation, but at any event causes high servicing costs as the detached or protruding foil pieces (foil corners) have to be re-secured to the rotor blade again or fresh foils have to be fitted.

A sliding or slippery sealant as is offered by Coelan under the designation VP 1970M, is suitable as an anti-erosion lacquer with which it is possible to eliminate the problems of the known anti-erosion foil. That involves a solvent-bearing 2-component PUR lacquer having TEFLON-like surface properties and the following characteristics:

| | | |
|---|---|---|
| Solids content: | Component A | about 60% |
| | Component B | about 5% |
| | Mixture | about 32% |
| Flash point: | −22° C. | |
| Density: | Component A | 1.11 g/cm$^3$ (20° C.) |
| | Component B | 0.83 g/cm$^3$ (20° C.) |
| Viscosity: | Component A | about 80 s DIN 4 (23° C. |
| | Component B | <10 s DIN 4 (23° C.) |
| Processing time: | about 16 h in a closed container | |
| Skinning: | about 30 min | (20° C.; 50% relative air humidity) |
| Non-tacky after: | about 2 h | (20° C.; 50% relative air humidity) |
| Completely dry: | about 96 h | (20° C.; 50% relative air humidity) |
| Pendulum hardness: | 147 seconds | (in accordance with König; DIN 53157) |
| Quick weathering: (QUV-test) | withstood 2350 h UV-A with the Q-panel apparatus | |
| | withstood 2430 h UV-B with the Q-panel apparatus | |
| Mixture ratio: | Component A | 100 parts by weight |
| | Component B | 100 parts by weight |

That lacquer was developed for boat building, but the use thereof in relation to rotor blades for reducing the generation of noise has hitherto never yet been proposed and is highly advantageous because it makes it possible to replace the known anti-erosion foil and eliminate the problems thereof.

All of the above U.S. patents, U.S. patent application publications, U.S. patent applications, foreign patents, foreign patent applications and non-patent publications referred to in this specification and/or listed in the Application Data Sheet, U.S. patent application Ser. No. 09/857,925 filed on Aug. 27, 2001; and International Application No. PCT/EP99/09691 filed on Dec. 9, 1999, are incorporated herein by reference, in their entirety.

The invention claimed is:

1. A rotor blade comprising:
   a surface;
   a fluid repellent structure coated on at least a portion of said surface, said structure having a plurality of nano-nails providing a degree of unevenness and irregularity on said portion of the surface such that water drops do not adhere to the rotor blade surface and rotor blade sound generation in operation of a wind power installation is lessened.

2. A rotor blade according to claim 1 wherein the fluid-repellent structure is coated on at least those parts of the rotor blade where the sound is generated upon rotation of the rotor blade.

3. A rotor blade according to claim 1 wherein the nano-nails are spaced from each other in the range of between 2 and 250 μm and the height of the nano-nails are in the range of between 2 and 250 μm.

4. A rotor blade according to claim 1 wherein the nano-nails are spaced from each other in the range of between 5 and 110 μm and the height of the nano-nails are in the range of between 5 and 60 μm.

5. A rotor blade according to claim 1 wherein the nano nails comprise hydrophobic polymers or durably hydrophobized materials which cannot be detached by natural rain.

6. A rotor blade according to claim 1 wherein the nano-nails are deformable along their longitudinal directions.

7. A rotor blade according to claim 1 wherein portions of the rotor blade is coated with an anti-erosion lacquer.

8. A rotor blade according to claim 7 wherein said portion of the rotor blade is the rotor blade leading edge.

9. A wind power installation comprising a rotor blade according to claim 1.

* * * * *